(12) United States Patent
Kao

(10) Patent No.: US 8,947,044 B2
(45) Date of Patent: *Feb. 3, 2015

(54) WIRELESS CHARGING SYSTEM AND RELATED METHOD FOR TRANSMITTING DATA

(75) Inventor: Yi-Sheng Kao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 531 days.

This patent is subject to a terminal disclaimer.

(21) Appl. No.: 13/348,611

(22) Filed: Jan. 11, 2012

(65) Prior Publication Data

US 2013/0127407 A1    May 23, 2013

(30) Foreign Application Priority Data

Nov. 17, 2011   (TW) .............................. 100142159 A

(51) Int. Cl.
| | | |
|---|---|---|
| *H02J 7/00* | (2006.01) | |
| *H02J 7/14* | (2006.01) | |
| *H02J 7/02* | (2006.01) | |
| *H01M 10/44* | (2006.01) | |
| *H02J 17/00* | (2006.01) | |
| *H04B 5/00* | (2006.01) | |

(52) U.S. Cl.
CPC ............... *H02J 7/025* (2013.01); *H01M 10/44* (2013.01); *H02J 17/00* (2013.01); *H04B 5/0037* (2013.01); *H04B 5/0075* (2013.01)
USPC ............ 320/108; 320/109; 320/134; 320/137

(58) Field of Classification Search
USPC ......... 320/108, 128, 137, 145, 106, 107, 115, 320/109, 113, 134, 138, 139, 167
See application file for complete search history.

(56) References Cited

U.S. PATENT DOCUMENTS

| | | | |
|---|---|---|---|
| 6,934,167 B2 * | 8/2005 | Jang et al. ................. | 363/21.02 |
| 7,615,965 B2 | 11/2009 | Popescu-Stanesti | |
| 7,812,481 B2 * | 10/2010 | Iisaka et al. .................. | 307/104 |
| 8,013,568 B2 | 9/2011 | Park | |
| 8,427,330 B2 * | 4/2013 | Vorenkamp et al. ....... | 340/636.2 |
| 8,450,877 B2 * | 5/2013 | Baarman et al. ............. | 307/104 |

(Continued)

FOREIGN PATENT DOCUMENTS

| | | |
|---|---|---|
| CN | 1741345 A | 3/2006 |
| CN | 101233665 A | 7/2008 |
| TW | 200631277 | 9/2006 |

OTHER PUBLICATIONS

Office action mailed on Jun. 17, 2014 for the China application No. 201110409149.1, p. 3 line 2-31, p. 4-6 and p. 7 line 1-17.

(Continued)

*Primary Examiner* — Edward Tso
*Assistant Examiner* — Alexis A Boateng
(74) *Attorney, Agent, or Firm* — Winston Hsu; Scott Margo

(57) ABSTRACT

The invention discloses a wireless charging system for transmitting data. The wireless charging system includes a charging device for wirelessly transmitting a source signal and adjusting a current corresponding to the source signal according to a transmitted datum, and a receiving device which includes a first coil for receiving the source signal according to the electromagnetic effect and generating a corresponding AC current signal, and an output module for obtaining the transmitted datum according to the AC current signal.

9 Claims, 5 Drawing Sheets

(56) References Cited

U.S. PATENT DOCUMENTS

| | | | |
|---|---|---|---|
| 2008/0079392 A1* | 4/2008 | Baarman et al. | 320/108 |
| 2008/0197804 A1* | 8/2008 | Onishi et al. | 320/108 |
| 2009/0015197 A1* | 1/2009 | Sogabe et al. | 320/108 |
| 2009/0033280 A1* | 2/2009 | Choi et al. | 320/108 |
| 2011/0025265 A1* | 2/2011 | Mochida et al. | 320/108 |
| 2011/0291489 A1* | 12/2011 | Tsai et al. | 307/104 |
| 2012/0007443 A1* | 1/2012 | Tsai et al. | 307/104 |

OTHER PUBLICATIONS

Office action mailed on Dec. 12, 2013 for the Taiwan application No. 100142159, filing date: Nov. 17, 2011, p. 1 line 11-12, p. 2-6 and p. 7 line 1-7.

* cited by examiner

WIRELESS CHARGING SYSTEM AND RELATED METHOD FOR TRANSMITTING DATA

BACKGROUND OF THE INVENTION

1. Field of the Invention

The present invention relates to a wireless charging system and a related method, and more particularly, to a wireless charging system and a related method for transmitting data while wirelessly charging.

2. Description of the Prior Art

Generally, commercial electronic devices use charging devices like transformers for plug-in-charging, and need to comply with specific spec-qualified charging devices. Users have no choice but purchase corresponding charging devices related to the commercial electronic devices since there is no universal charging device. Also, the commercial electronic devices need spare holes and lines to install plug-in-charging modules for connecting with the charging devices. To those who pursue beauty and convenience, the above description has abased their desires to purchase those commercial electronic devices. Accordingly, the prior art has disclosed concepts and mechanisms of a wireless charging for the commercial electronic devices.

In simple terms, the principle of wireless charging is similar to operation of an electric generator, operating as a wireless charging which transforms electric energy into magnetic energy and transmits via electromagnetic wave from a transmitting end (i.e. the charging device) to a receiving end (i.e. the commercial electric device). Sensing coils or radio frequency means are utilized to exchange energy between the transmitting end and the receiving end. Also, any datum can be exchanged between the transmitting end and the receiving end via the same transmitting path, such as the electromagnetic wave, so as to increase wireless charging application.

However, due to increasing amounts of transmitting data, it is impossible to transmit those data within a short period in comparison with cable transmission. Also, physical limitation of electromagnetic wave sets up barrier for wireless transmission. All drawbacks cause a waste of time in cable transmission and force users to abandon wireless charging accompanying with transmitting data. Therefore, it has become an important issue to provide a wireless charging technique which increases efficiency of transmitting data between the transmitting end and the receiving end.

SUMMARY OF THE INVENTION

It is therefore an objective of the present invention to provide a wireless charging system for transmitting data.

An embodiment of the invention discloses a wireless charging system for transmitting data that includes a charging device for wirelessly transmitting a source signal and adjusting a current value corresponding to the source signal according to a transmitted datum; and a receiving device including a first coil for receiving the source signal according to electromagnetism and accordingly generating an AC current signal, and an output module for retrieving the transmitted datum according to the AC current signal.

An embodiment of the invention further discloses a data transmitting method for a wireless charging system, wherein the wireless charging system includes a charging module and a receiving module. The data transmitting method includes the charging module coupled to the receiving module via an interacting magnetic field, so as to transmit a source signal to the receiving module in a radio frequency way; the charging module adjusting a current value corresponding to the current signal according to a transmitted datum, so as to transmit the transmitted datum to the receiving module via the source signal; and the receiving module receiving the source signal via electromagnetism, so as to retrieve the transmitted datum within the source signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
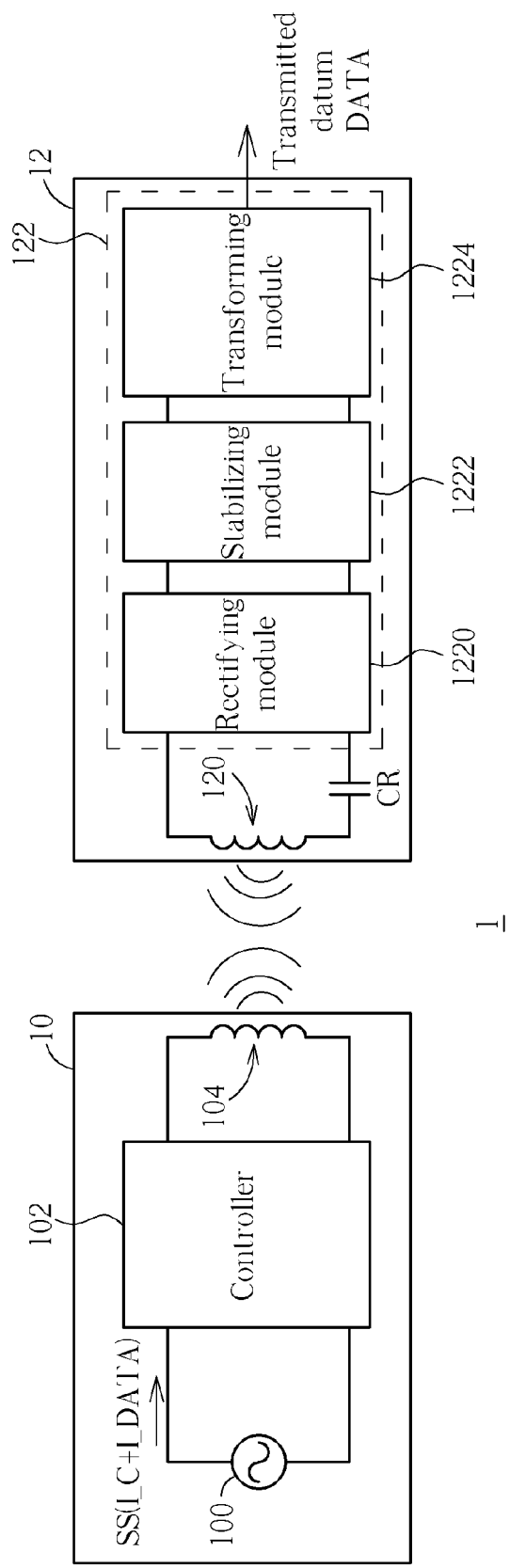
FIG. 1 illustrates a schematic diagram of a wireless charging system according to an embodiment of the invention.

Please refer to FIG. 1, which illustrates a schematic diagram of a wireless charging system 1 according to an embodiment of the invention. As shown in FIG. 1, the wireless charging system 1 includes a charging device 10 and a receiving device 12. The charging device 10 includes a first current source 100, a controller 102 and a second coil 104. The receiving device 12 includes a first coil 120 and an output module 122, wherein the output module 122 further includes a rectifying module 1220, a stabilizing module 1222 and a transforming module 1224. The wireless charging system 1 sets up a wireless communication connection between the charging device 10 and the receiving device 12 via electromagnetic effect, so as to transmit a source signal SS carrying a transmitted datum DATA from the charging device 10 to the receiving device 12.

Simply, the wireless charging system 1 of the present invention not only provides a wireless charging between the charging device 10, such as a charging machine, and the receiving device 12, such as a mobile device, but also sets up a wireless data transmission between the charging machine and the mobile device. For example, the charging machine can transmit a thermal sensing signal to the mobile device, to monitor a temperature change of the mobile device while the mobile device is being charged. Meanwhile, the mobile device can actively transmit a termination signal to the charging machine for stopping the wireless charging. In this embodiment, the source signal SS is realized by a current type including a fixed current I_C carrying a minor current change I_DATA, such that the charging device 10 can process the wireless charging to the receiving device 12 via the fixed current I_C and set up a data exchange between the charging device 10 and the receiving device 12 via the minor current change I_DATA, so as to perform operation of the wireless charging as well as the wireless data transmission.

In detail, the first current source 100 of the charging device 10 generates the source signal SS, such as outputting a fixed current 5 A. The controller 102 dynamically adjusts an equivalent resistance according to users' requirement or needs of the receiving device 12, so as to further generate the minor current change I_DATA within a predetermined range, such as a slightly adjustment of 0.1 A upward or downward based on 5 A (i.e. the source signal SS outputs within the range from 4.9 A to 5.1 A). Those current changes mentioned above and appropriate timing for adjustment are demonstrated as examples, and corresponding software, hardware or firmware can be installed additionally according to practical users' requirement. The second coil 104 transmits the source signal SS to the receiving device 12 via electromagnetism, and sets up an interacting magnetic field with the first coil 120. Since those skilled in the art are familiar with electromagnetism, it is not narrated hereinafter.

Furthermore, after the source signal SS transforms into an AC current type via electromagnetism, the receiving device 12 utilizes the first coil 120 in series with a capacitor CR to receive the source signal SS. The rectifying module 1220 rectifies the AC current type into a DC current type in order to transmit to the stabilizing module 1222. The stabilizing module 1222 maintains the minor current change I_DATA within the predetermined range setup by the user, to comply with a wireless transmission condition between the charging module 10 and the receiving module 12, so as to output the source signal SS to the transforming module 1224. Finally, the transforming module 1224 transforms the minor current change I_DATA carried by the source signal SS into a digital signal, such as 01101101, so as to obtain the transmitted datum DATA. The stabilizing module 1222 can divide the source signal SS into the fixed current I_C and the minor current change I_DATA, wherein the former is utilized for wirelessly charging of the receiving device 12, and the latter is transmitted to the transforming device 1224 to form the transmitted datum DATA, i.e. a plurality of digital signals. Therefore, the wireless charging system 1 transmits the fixed current I_C as well as the transmitted datum DATA corresponding to the minor current change I_DATA from the charging device 10 to the receiving device 12 via the wireless transmission, so as to process the wireless charging as well as the wireless data transmission. Detailed circuits of the charging device 10 and receiving device 12 will be described as the following.

Figure 2:
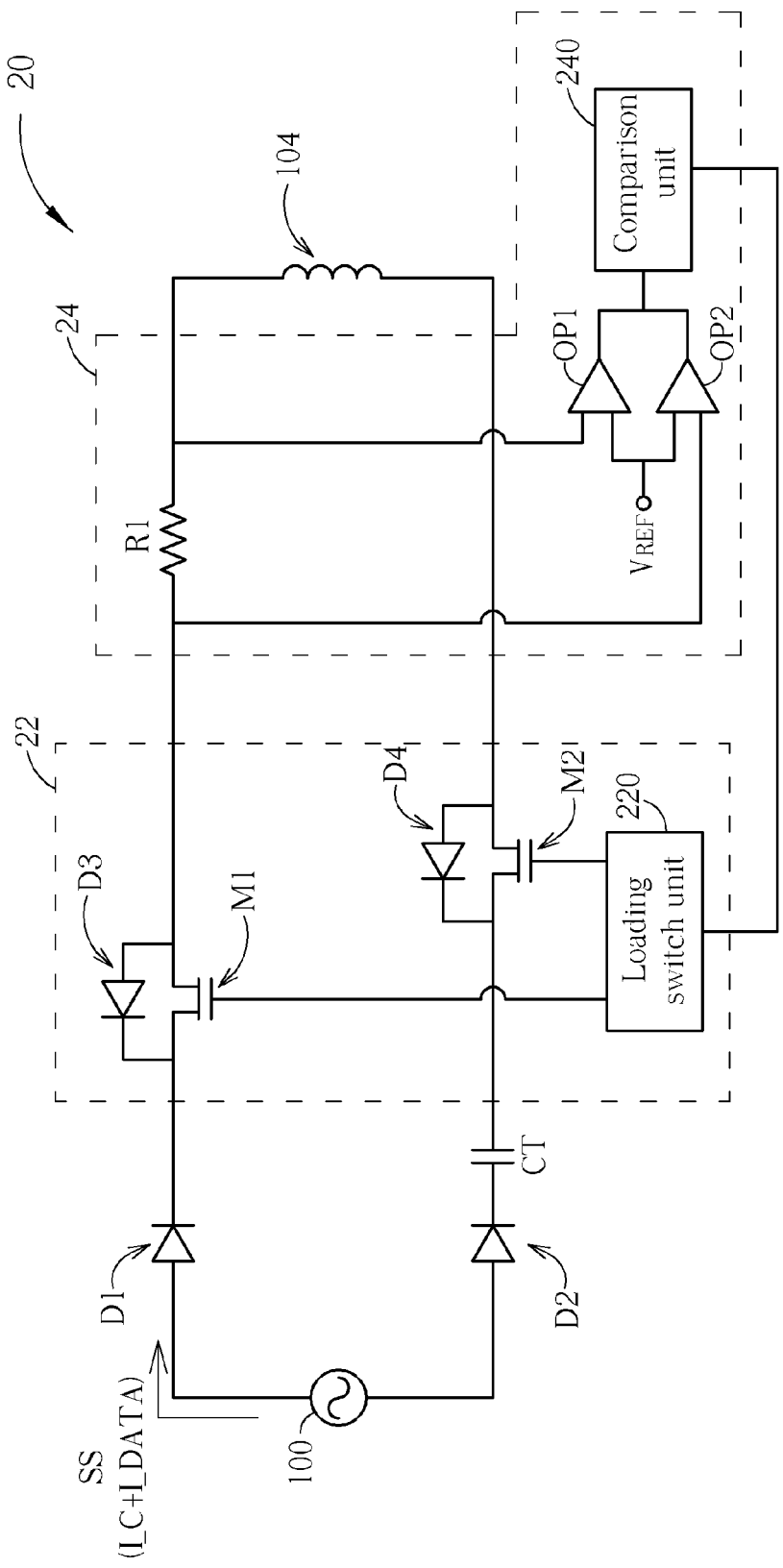
FIG. 2 illustrates a schematic diagram of the charging device according to an embodiment of the invention.

Please refer to FIG. 2, which illustrates a schematic diagram of the charging device 20 according to an embodiment of the invention. In comparison with the charging device 10 in FIG. 1, the charging device 20 shown in FIG. 2 still includes the first current source 100 and the second coil 104, and further provides practical circuits for realization of the controller 102. As shown in FIG. 2, the first current source connects in series with diodes D1, D2 and a capacitor CT to protect and stabilize the source signal SS, and connects in parallel with a loading module 22 and a comparison module 24. The loading module 22 includes switches M1, M2 realized by MOS transistors, a diode D3, D4 and a loading switch unit 220. The comparison module 24 includes a resistor R1, a comparison unit 240 and operating amplifiers OP1, OP2. The loading module 22 switches on or off the switches M1, M2 according to the transmitted datum DATA and a feedback signal (not shown in figure) transmitted from the comparison module 24, to dynamically adjust the equivalent resistance of the loading module 22 in order to adjust an output current of the first current source 100 accordingly, i.e. the source signal SS includes the fixed current I_C and the minor current change I_DATA. Other elements or units of the charging device 20 are similar to the charging device 10, which is not described hereinafter.

Figure 3:
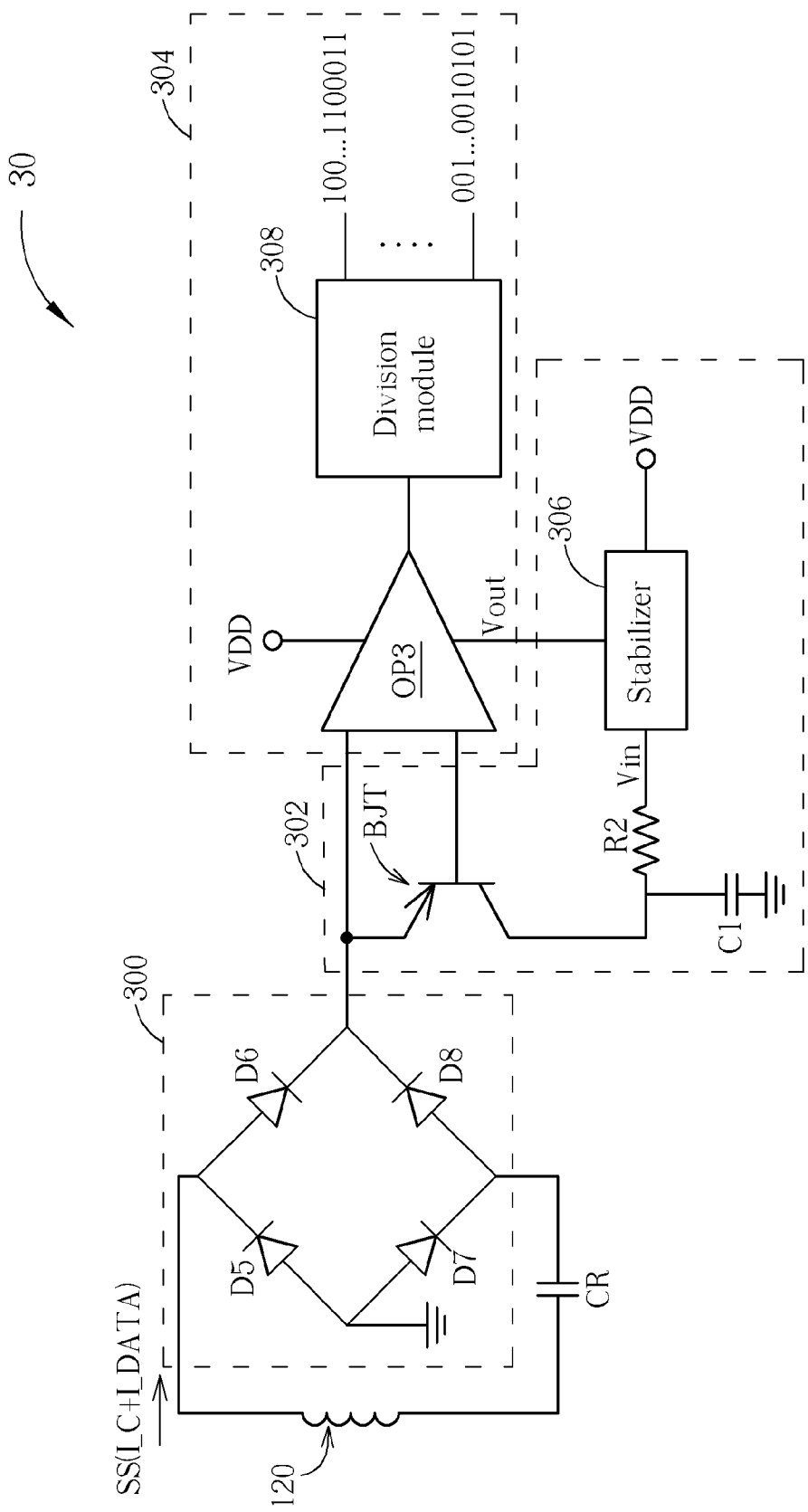
FIG. 3 illustrates a schematic diagram of the receiving device according to an embodiment of the invention and shows a practical circuit realization of the receiving device.
Figure 4:
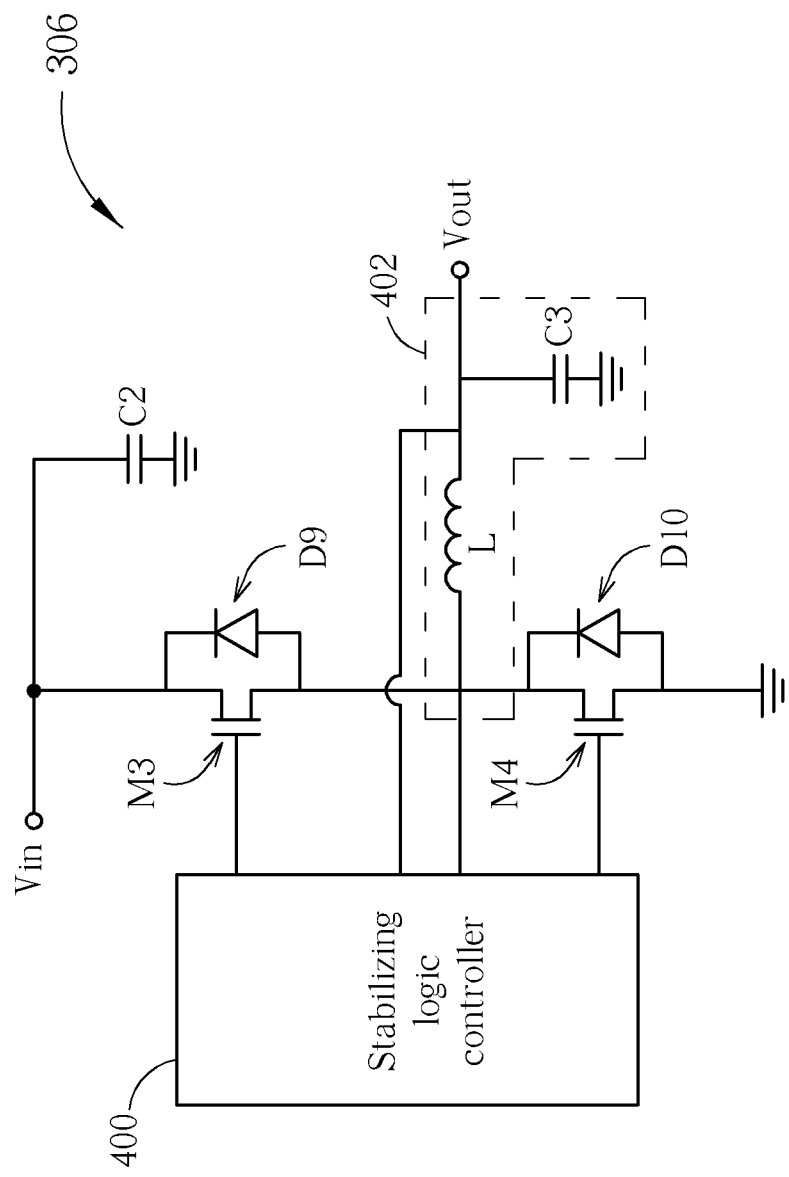
FIG. 4 illustrates a detailed schematic diagram of a stabilizer in FIG. 3.

Please refer to FIG. 3 and FIG. 4 as well, wherein FIG. 3 illustrates a schematic diagram of the receiving device 30 according to an embodiment of the invention and shows a practical circuit realization of the receiving device 30, and FIG. 4 illustrates a detailed schematic diagram of a stabilizer 306 in FIG. 3. As shown in FIG. 3, the receiving module 30 also includes the first coil 120 connecting in series with a capacitor CR, a rectifying module 300, a stabilizing module 302 and a transforming module 304. In this embodiment, the rectifying module 300 is realized via diodes D5, D6, D7 and D8. The stabilizing module 302 is realized via a bipolar junction transistor BJT, a capacitor C1, a resistor R2 and the stabilizer 306. The transforming module 304 is realized via an operating amplifier OP3 and a division module 308. Since the receiving module 30 has similar device connecting relationships as well as operating function with the receiving device 12, they are not described hereinafter.

As shown in FIG. 4, the stabilizer 306 connects in series with the transforming module 304 via terminals Vin and Vout, and includes a capacitor C2 connected to a ground, a stabilizing logic controller 400, a up-loop switch M3, a down-loop switch M4, diodes D9 and D10, and an oscillating module 402 including an inductor L and a capacitor C3. The stabilizing logic controller 400 tests a transmitting environmental condition, i.e. a transmitting speed of the transmitted datum, between the charging device 20 and the receiving device 30 according to a testing information transmitted by the charging device 10, to determine whether or not to switch on the up-loop switch M3 for high speed transmission or the down-loop switch M4 for low speed transmission. Also, according to terminal voltages of the inductor L, a switching frequency between the up-loop switch M3 and the down-loop switch M4 is determined, to reduce an output current of the terminal Vout and maintain an input current of the terminal Vin, so as to maintain the source signal SS within the predetermined range. Therefore, the wireless charging system 1 of the present invention provides the wireless charging as well as the wireless data transmission, and further determines the transmitting environmental condition before transmitting the datum, so as to satisfy different users' requirement.

Figure 5:
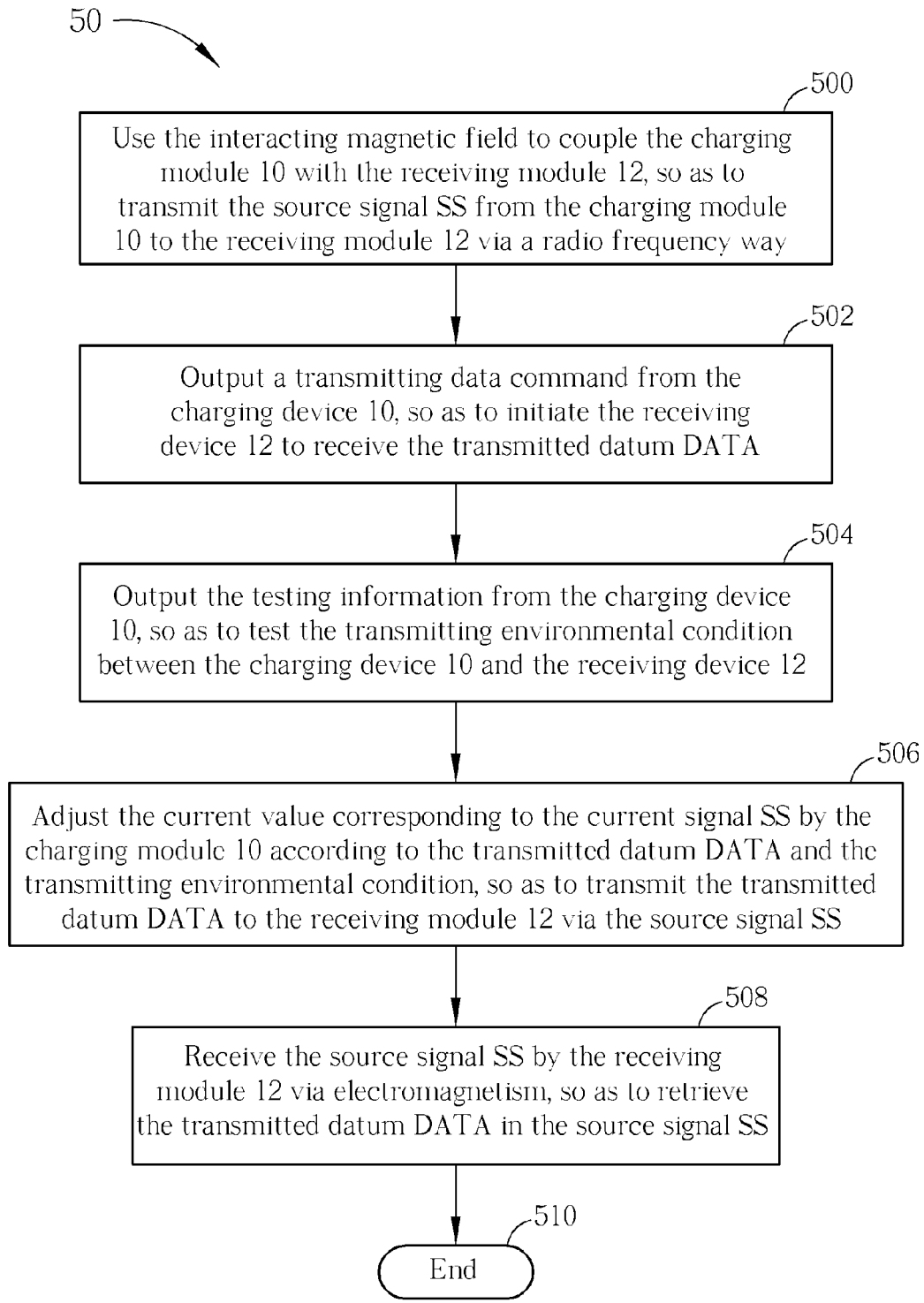
FIG. 5 illustrates a flow chart of a data transmitting process according to an embodiment of the invention.

The data transmitting method for the wireless charging system 1 according to an embodiment of the invention can be summarized as a data transmitting process 50, as shown in FIG. 5. The data transmitting process 50 includes the following steps:

Step 500: Use the interacting magnetic field to couple the charging module 10 with the receiving module 12, so as to transmit the source signal SS from the charging module 10 to the receiving module 12 via a radio frequency way.

Step 502: Output a transmitting data command from the charging device 10, so as to initiate the receiving device 12 to receive the transmitted datum DATA.

Step 504: Output the testing information from the charging device 10, so as to test the transmitting environmental condition between the charging device 10 and the receiving device 12.

Step 506: Adjust the current value corresponding to the current signal SS by the charging module 10 according to the transmitted datum DATA and the transmitting environmental condition, so as to transmit the transmitted datum DATA to the receiving module 12 via the source signal SS.

Step 508: Receive the source signal SS by the receiving module 12 via electromagnetism, so as to retrieve the transmitted datum DATA in the source signal SS.

Step 510: End.

The data transmitting process 50 describes operation of the wireless charging and the wireless data transmission between the charging device 10 and the receiving device 12. In step 500, the charging device 10 and the receiving device 12 sets up mechanism of the wireless charging, i.e. the charging device 10 wirelessly charges the receiving device 12 via the fixed current I_C. In step 502, when the user wants to transmit the transmitted datum DATA, the charging device 10 outputs the transmitting data command, to initiate mechanism of the wireless data transmission of the receiving device 12. When mechanism of the wireless data transmission initiates and value of the fixed current I_C remains stable for a while, it enters into step 504 to test the transmitting speed, i.e. the transmitting environmental condition, between the charging device 10 and the receiving device 12. It is determined whether or not to process the high speed transmission, such as the minor current change I_DATA corresponding to the transmitted datum DATA is transformed into 128 bits of information, or to process the low speed transmission, such as the minor current change I_DATA corresponding to the transmitted datum DATA is transformed into 16 bits of information. In step 506, the charging device 10 dynamically adjusts the minor current change I_DATA corresponding to the transmitted datum DATA by the controller 102 according to the current transmitting speed and the transmitted datum DATA. In step 508, the transforming module 122 transforms the minor current change I_DATA corresponding to the transmitted datum DATA into the digital signal, so as to finish the wireless data transmission.

Noticeably, in the data transmitting process 50 of the present invention, the charging device 10 and the receiving device 12 sets up not only the mechanism for wirelessly charging but also a two-way wireless data transmission. In other words, via the wireless charging system 1 and the data transmitting process 50, those skilled in the art can be familiar with transmitting the transmitted datum DATA from the charging device 10 to the receiving device 12, and conversely that the receiving device 12 reversely transmits a wireless signal to the charging device 10. In addition, the data transmitting process 50 is not limited from the above, that of when to initiate mechanism of the wireless data transmission (step 502) or when to determine the transmission speed (step 504) between the charging device 10 and the receiving device 12. Any additional adjustments can be added or reduced respectively according to different users' requirement. In short, those skilled in the art can have the concept of utilizing the transmitted data DATA to be transformed to a corresponding current change carried on the fixed source signal SS, and further combine/remodel with different hardware/software/firmware to achieve the same purpose, which are the same scope of the present invention.

In all, the present invention discloses a wireless charging system which sets up a wireless communication between a charging device and a receiving device. The charging device transmits a fixed current to the receiving device for wirelessly charging, and transforms a transmitted datum into a minor current change carried by the fixed current, so as to transmit to the receiving device. Therefore, the receiving device further provides another choice for a wireless high/low speed transmission with the charging device during the wireless charging, which also increases efficiency of the wireless data transmission as well as application of the products.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless charging system for transmitting data comprises:
    a charging device for wirelessly transmitting a source signal and adjusting a current value corresponding to the source signal according to a transmitted datum; and
    a receiving device comprising:
        a first coil for receiving the source signal according to electromagnetism and accordingly generating an AC current signal; and
        an output module comprising:
            a rectifying module, electrically connected to the first coil for rectifying the AC current signal to generate a DC current signal;
            a transforming module, for transforming the DC current signal into a digital signal to retrieve the transmitted datum; and
            a stabilizing module for stabilizing the DC current signal, comprising:
                an up-loop switch, comprising an input end coupled to a power supply, an output end and a control end;
                a down-loop switch, comprising an input end coupled to the output end of the up-loop switch, an output end coupled to the ground and a control end;
                an oscillating module, comprising a capacitor and a inductor; and
                a stabilizing logic controller, for outputting a control signal to the control end of the up-loop switch and the control end of the down-loop switch according to terminal voltage of both ends of the inductor, so as to switch on or off the up-loop switch and the down-loop switch.

2. The wireless charging system of claim 1, wherein the transforming module comprises:
    an operating amplifier, electrically connected to the rectifying module and the stabilizing module for receiving the DC current signal, to generate a amplifying current; and
    a division module, electrically connected to the operating amplifier for transforming changes of the amplifying current into a plurality of bit information, to retrieve the transmitted datum.

3. The wireless charging system of claim 1, wherein the charging module comprises:
    a first current source, for supplying a current signal;
    a controller, for adjusting the current value of the current signal according to the transmitted datum; and
    a second coil, for transforming the current signal into the source signal, and transmitting the source signal to the receiving module via electromagnetism.

4. A data transmitting method for a wireless charging system, wherein the wireless charging system comprises a charging module and a receiving module, the data transmitting method comprising:
    the charging module coupled to the receiving module via an interacting magnetic field, so as to transmit a source signal to the receiving module in a radio frequency way;
    the charging module adjusting a current value corresponding to the current signal according to a transmitted datum, so as to transmit the transmitted datum to the receiving module via the source signal; and
    the receiving module receiving the source signal via electromagnetism, so as to retrieve the transmitted datum within the source signal;
    wherein the receiving module comprises:
        a first coil for receiving the source signal according to electromagnetism and accordingly generating an AC current signal; and an output module comprising:
- a rectifying module, electrically connected to the first coil for rectifying the AC current signal to generate a DC current signal;
- a transforming module, for transforming the DC current signal into a digital signal to retrieve the transmitted datum; and
- a stabilizing module for stabilizing the DC current signal, comprising:
  - an up-loop switch, comprising an input end coupled to a power supply, an output end and a control end;
  - a down-loop switch, comprising an input end coupled to the output end of the up-loop switch, an output end coupled to the ground and a control end;
  - an oscillating module, comprising a capacitor and a inductor; and
  - a stabilizing logic controller, for outputting a control signal to the control end of the up-loop switch and the control end of the down-loop switch according to terminal voltage of both ends of the inductor, so as to switch on or off the up-loop switch and the down-loop switch.

5. The data transmitting method of claim 4, wherein the charging module stabilizes the current value corresponding to the source signal around a fix value, so as to adjusting the current value within a predetermined range according to the transmitted datum.

6. The data transmitting method of claim 4, wherein the receiving module detects changes in the current value corresponding to the source signal, to retrieve the transmitted datum within the source signal.

7. The data transmitting method of claim 4, further comprising the charging module transmitting a transmitting data command before adjusting the current value corresponding to the source signal according to the transmitted data, so as to initiate the receiving module to receive the transmitted data.

8. The data transmitting method of claim 4, further comprising the charging module adjusting the current value corresponding to the source signal according to a testing information before adjusting the current value corresponding to the source signal according to the transmitted data, so as to detect a transmitting environmental condition.

9. The data transmitting method of claim 4, wherein the step of the charging module adjusting the current value corresponding to the source signal according to the transmitted datum further comprises:
- the charging module adjusting the current value corresponding to the source signal according to the transmitted datum and the transmitting environmental condition.

* * * * *